Feb. 21, 1967   H. BECHER   3,304,714
TURBINE ENGINE
Filed June 20, 1965   4 Sheets-Sheet 1
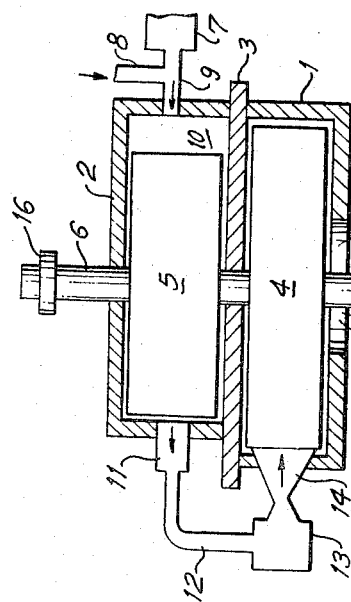
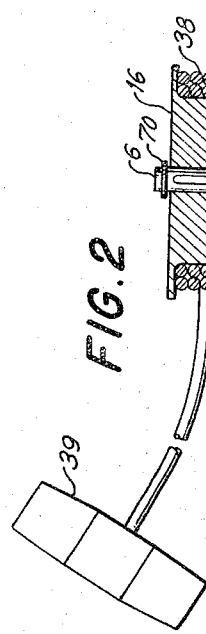
INVENTOR.
Harold Becher Feb. 21, 1967 H. BECHER 3,304,714
TURBINE ENGINE
Filed June 20, 1965 4 Sheets-Sheet 2

Harold Becher
INVENTOR.

Feb. 21, 1967 H. BECHER 3,304,714
TURBINE ENGINE
Filed June 20, 1965 4 Sheets-Sheet 3

INVENTOR.
Harold Becher

Feb. 21, 1967  H. BECHER  3,304,714
TURBINE ENGINE

Filed June 20, 1965  4 Sheets-Sheet 4

INVENTOR.

United States Patent Office 3,304,714
Patented Feb. 21, 1967

3,304,714
TURBINE ENGINE
Harold Becher, 932 Carroll St.,
Brooklyn, N.Y. 11225
Filed July 20, 1965, Ser. No. 473,418
7 Claims. (Cl. 60—39.75)

This invention relates to power generating systems, more particularly to gasoline turbine engines.

An object of this invention is to provide a system which is novel in compactness of design and adaptability to many uses and in performance characteristics.

Another object is to provide a new and novel engine which utilizes very plentiful, inexpensive, safe and universally available fuel such as kerosene, gasoline, alcohol and common fuel oil for supplying the energy for propulsion.

Another object is to provide a turbine engine which is quiet in operation.

Another object is to provide an engine which can operate in an environment of sand or gravel.

Another object is to provide a design which results in a minimum number of parts, easy to fabricate and assemble in mass production.

Another object is to provide an engine which is capable of operation in all kinds of weather conditions and is easily accessible for maintenance.

Another object is to provide a turbine system which is capable to utilize the hot gases of combustion at high temperatures and velocities without the failure of the turbine blades.

Another object of this invention is to provide an engine which will be light in weight in proportion to power output.

Another object of the invention is to utilize the Tesla disk turbine, patented by N. Tesla in 1913 (Pat. No. 1,061,206) as a component in a gasoline and the like driven engine.

The Tesla turbine is described in the technical literature of 1911 to 1913 as having been used to develop high shaft power by utilizing steam as the propelling agent. The steam was used at 135 p.s.i. freely exhausting to the atmosphere. An 18-inch diameter disc turbine, 3½ inches wide, spinning at 9000 r.p.m. produced 300 h.p.; a 9¾ inch diameter turbine, 2 inches wide, spinning at 16,000 r.p.m. has produced 110 hp. Tesla claimed an efficiency of over 90%.

Mathematical studies have been made at various universities here and aboard of the physical phenomena associated with the Tesla turbine, but, with the exception of its use in missile propulsion, patented by C. B. Hatfield in 1962 (Pat No. 3,024,596) no practical applications of the Telsa turbine have been developed for common use under practical conditions and low power parameters. Hatfield claims to operate the Tesla turbines at 800 p.s.i and at 16,000 r.p.m. Such pressures and speeds, while practical in missiles, aircraft and large engine systems, are impractical to apply in the relatively small-motor field, such as automobiles, small boats, outboard motors, automobile auxiliary starters, lawn mowers, scooters and the like, and fields of operation where engines in the range of fractional to about 500 horsepower are required, although not limited thereto.

An object of my invention is to provide a gas propelled engine, utilizing the Tesla turbine capable of furnishing power for the operation of the aforementioned items and in the aforementioned low power ranges.

These and other objects will appear more fully upon consideration of the detailed description of the embodiment of the invention which follows and the appended drawings. It is to be expressly understood that these drawings and descriptions are for the purpose of illustration only and are not to be construed as defining the scope of the invention for which latter purpose reference should be made to the appended claims.

Referring now to the drawings, wherein like reference characters indicate like parts throughout the several views. (These views are shown in several scales for convenience of illustration.)

FIG. 1 is a schematic representation of the basic components of my invention showing their relationship.

FIG. 2 is a detailed section view of an embodiment of my invention assembled on a lawn mower.

Figure 3:
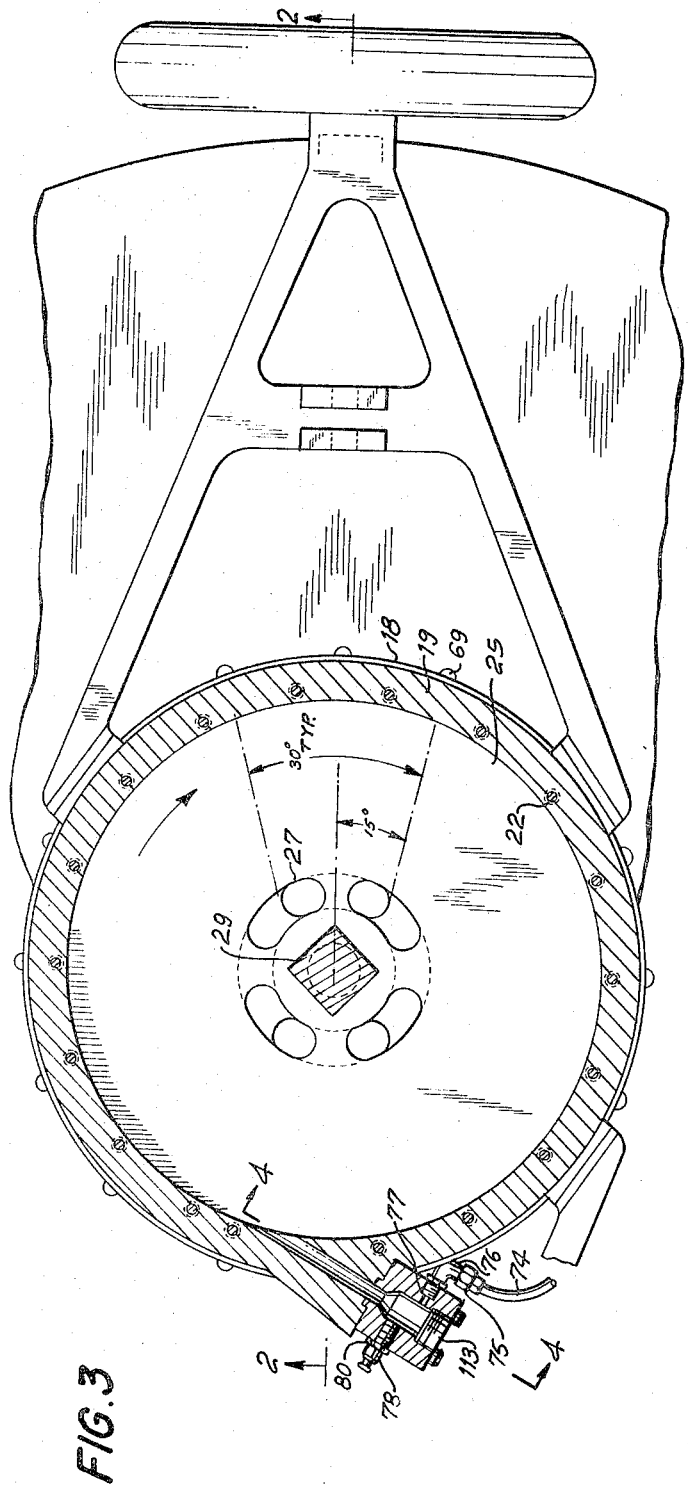
FIG. 3 is a top section view of FIG. 2 along 3—3.

Referring to FIG. 1, a schematic presentation is made of the elements of my invention which shows a sectional view of a round cylindrical casing, cup-shaped, hereinafter referred to as "cup" and sometimes referred to as "casing" or as "housing" or as "shell" which contains the Tesla turbine hereinafter to be described. The housing and the turbine are concentric in relation to each other and to shaft 6. The bottom of the housing has a hole 15 for the escape of the exhaust gases when they leave the turbine disks. The open top of the housing is covered by a plate 3, preferably round and extending beyond the outer circumference of the housing. In the center of the plate 3 there is a hole for the shaft 6. On top of the plate 3 and eccentric to the shaft 6 is a cylindrical housing 2 in which a compressor-rotor 5, hereinafter described, is located concentric to the shaft 6. The open bottom of the housing 2 rests on the top of the plate 3, the plate 3, housings 2 and 1 forming a contiguous structure, the plate 3 dividing and retaining the two housings. The housings can be secured to the plate 3 by welding or may be clamped together, or, by provision of flanges around the open end of each housing, can be secured by fasteners.

Entering the eccentric side 10 of the housing 2 is a duct 9 which is connected to an air filter 7 and a fuel source 8. The compressor-rotor 5, in the manner hereinafter to be described, compresses the fuel and air mixture when the starter 16, located on the upper portion of the shaft 6, is rotated. The compressed mixture is released through the check valve 11 and duct 12 into a combustion chamber 13 where the mixture is ignited. The combustion gases enter a converging-diverging nozzle 14 whose exit port is located tangentially on the side of the cup 1, thereby releasing the hot gases, at a high velocity, into the disks of the Tesla turbine 4. The gases, after releasing their kinetic energy to the rotating disks, escape through the exhaust 15, The plate 3, besides serving as a partition and support for the two housings also, by absorbing and transferring some of the heat from the combustion gases in the turbine into the compressor chamber 10, preheats the fuel and air mixture making for more efficient combustion.

Referring to FIG. 2, an embodiment of my invention is shown mounted on a lawn mower. This embodiment contains the equivalent of the elements shown in FIG. 1 in the form of cast, stamped and machined components. The body of the lawn mower is represented as a lower fragment 16 consisting of the standard lawn mower base and wheels. A brace 17 is joined to the base 16 and to a cupped shell 18 by means of screws 68. The shell 18, in turn, supports the engine assembly and the reduction gearing hereinafter to be described. Around an opening in the bottom of the shell 18 is secured, by rivets 61, a ring 60. In the center of the ring is a seal 65. Through the center of the seal extends a flange 64 which is keyed to a central driving shaft 51 and secured to the shaft by a nut 62 and a washer 63. To the flange 64 are secured diametrically opposite each other, by rivets 67, a pair of lawn mower blades 66. Inside the upper rim of the shell 18 is secured, by screws 69 entering at various points on the outer circumference, a cast body 19. This body is constructed like a cylinder with vertical walls and a base. At the center of the body 19 is a hole in which is located a bushing 30 in which rests an extention of shaft 6. The casting has a pair of concentric grooves 23 on the inside face of the base. Around the center hole are a plurality of passages 28 which begin with respective holes descending from the surface of the base and continuing at right angles radially outward through the casting 19. This casting 19 is the equivalent of housing 1 in FIG. 1 and serves to house the rotor 4 of the Tesla turbine and the passages 28 are equivalent to the exhaust opening 15.

The Tesla turbine is comprised of a plurality of round disks 25, which can be from 1/64 inch to about 1/8 inch thick. These disks are stacked above each other and are separated by circular spacers 26. These spacers can be from .005 inch to about 1/16 inch thick. The spacers and the disks have a hole in the center of each through which enters the shaft 6. The portion 29 of the shaft which is embraced by the disks and spacers may be square in cross-section or may be splined or slotted to fit the center hole of the disks and spacers which may be square, splined or slotted to conform to the respective configuration. Each disk has a plurality of holes 27 located radially around the circumference of the spacers 26. These holes are located in each disk, in such positions that when the disks are assembled on the shaft they are directly on top of each other on a common vertical center or they may be placed so that the center of each succeeding disk is slightly advanced from the center of the preceding by a small equal increment.

In the center of the casting is a hole in which is placed a bushing 30, preferably of oilite or the like through which the shaft 6 enters a roller bearing 31 which is held in the casting 19 by a ring 36 secured to the casting by bolts 37.

This disks and spacers around the shaft portion 29 are now resting in the inner chamber of casting 29 so that the edges of the disks and the face of the lowermost disk of the stack are almost in contact with the inner face of the wall and floor of the casting 19. A separation of .001″ to about .005″ is preferable.

A casting 20 has a circular base concentric to a central hole in which enters the shaft 6. From the base rises a circular wall which is eccentric to the center hole of the base. The base has concentric grooves 24 on the bottom face which rests on the top of the casting 19 and is secured thereto by bolts 22. The topmost disk of the stack of disks which is inside the casting 19 is preferably separated from the lower face of the base by a distance of .001″ to .005″. The vertical, eccentric wall of the casting 20 is, together with the top casting 21 (hereinafter to be described) and with the base of casting 20 form an enclosure for the compressor-rotor. The base is equivalent to plate 3 on FIG. 1 and the wall of the top 20 equivalent to the cup 2 of FIG. 1.

The compressor consists of a rotor 5 and a slider 87. The rotor may be a solid cylindrical block with a radial slot to contain slider 87 and the spring 89 or, to reduce the weight, can be comprised of peripheral rings 81, 82 and 83 concentric to each other and to the shaft 6 which is keyed at 109 to the shaft 6 in a hole in the center of ring 83. The middle of the concentric cylindrical rings are joined by a cross-web 84. The rings are of an equal height and fit the height of the inside wall of 20.

Figure 6:
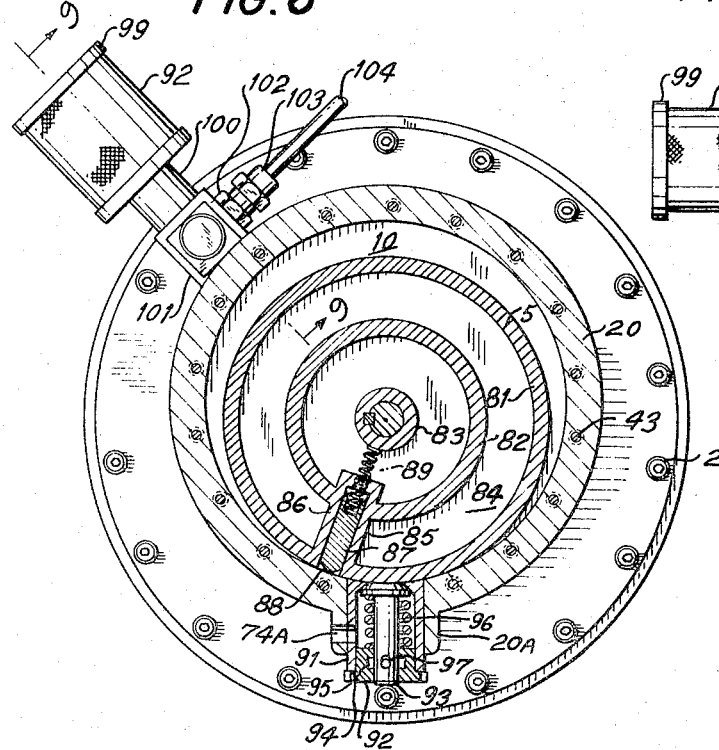
FIG. 6 is a top section view of FIG. 2 along 6—6.
Figure 7:
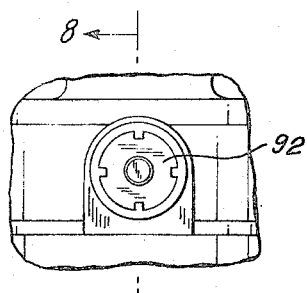
FIG. 7 is a front view of a segment of FIG. 6.

Referring to FIG. 6 a cross section of the compressor-rotor 5 is shown inside the eccentric housing 20. The concentric rings 8 and 82 are joined by two radial spokes 85 and 86, the inside walls of which are parallel to each other, having the same height as the rings. In the space between the spokes is a slider 87. The two spokes are backed by a rear wall back of ring 82 in which there is a hole which houses a spring 89 which presses against the rear of the slider 87 and the front wall of the ring 83.

Figure 8:
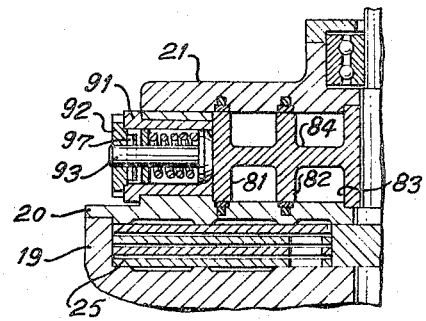
FIG. 8 is a section view of FIG. 7 along 8—8.

In one portion of the eccentric wall of the casing 20, at the point of minimum radius extends a boss 20A which has a through hole. In a hole is a brushing 91 which has a constricted hole at the end facing the rotor 5. Against the constricted end rests the mushroom head of a valve 93. The valve stem has an oval cross hole through which enters a cross-pin 97. A threaded cap 94 secures the valve stem in the rear threaded portion of the bushing 91. A spring 96 inside the bushing 91 serves to keep the valve head against its seat. O-rings 94 and 95 maintain a seal around the valve stem and cap. An orifice 74A across the wall 20A and the bushing 91 is provided for the entrance of tube 74 (FIG. 3). A modification of the valve structure is shown in FIG. 8 in regard to bushing 91. The valve is the equivalent of component 11 in FIG. 1. A flapper valve, well known in the art, consisting of a thin steel spring leaf or multileaf can be provided in place of the valve structure above described.

Figure 9:
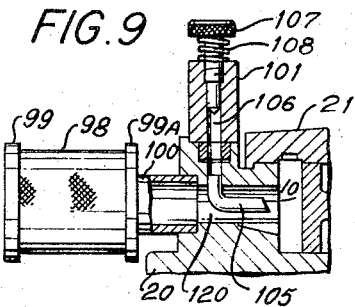
FIG. 9 is a front section view of FIG. 6 along 9—9.

On another location in the cylindrical wall of 20, from the eccentric region 10 thereof, is a hole 112 (see FIG. 9). In the hole there is an inserted tube 100 to which is connected a cylindrical wire mesh screen 98, capped by a pair of end plates 99, 99A at each end of the cylindrical screen. Plate 99A has a central hole into which enters the other end of the tube 100. At right angles to the hole 112, in the upper part of the wall of 20 there is a cross hole into which is set a tube 106 which is bent at right angles at 105 toward the passage 10. A bushing 101 has one end screwed into a widened portion of the hole 106. Into the other end of the bushing is screwed a threaded male knob 107. A spring 108 under the head of the knob 107 serves to introduce friction when the knob is rotated. In one side of the bushing is a hole which communicates into a tube 104 through the fittings 102 and 103. The structure described in this paragraph is the equivalent to components 7, 8 and 9 in FIG. 1.

Figure 4:
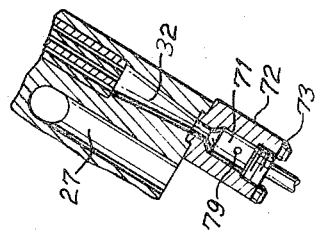
FIG. 4 is a front section view of FIG. 3 along 4—4.
Figure 5:
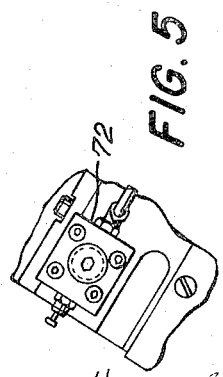
FIG. 5 is a front view of FIG. 4.

Referring to FIGS. 3, 4 and 5, the tube 74, leading from the casting 20 in FIG. 6 (from hole 74A) is connected by fittings 75, 76 and 77 into a block 72 through a hole 79 into a hole 71 which changes to converging-diverging hole 32 through the cylindrical wall 20, tangential to the inner circumference. A cross hole in the block 72 has screwed therein a glow plug 78 which is used for ignition. The glow plug is held by the nut 80.

The glow plug serves to ignite the fuel-air mixture. After the first ignition by the glow plug the ignition is self-sustaining. In place of the glow plug a spark wheel and flint or a striker and flint or a suitable match or a spark plug energized by a battery or magneto may be used.

A threaded closing plug 113 closes the rear opening of the hole 71 and is held in by bolts 73. The structure described in this paragraph is the equivalent of components 12, 13 and 14 of FIG. 1.

The casting 21 is a cover which is secured to the top of the cylindrical wall of casting 20 by bolts 43 equally spaced around the circular surface of 20. A central hole in 20 fits around the shaft 6 and an enlarged portion of the hole holds a roller bearing 40 around the shaft 6. On the top wall of the hole and the bearing is a circular plate 41 which has a central hole around the shaft 6 and is secured to 21 by bolts 42. Around the top of the shaft 6 is keyed a spool 16 around which is coiled a cord 38 which is tied to a handle 39. A snap-ring 70 around the shaft 6 above the top end of the spool keeps the spool from slipping off. The spool, cord and handle form the starting device 16 in FIG. 1. A ratchet may be coupled with the spool for repeat pulling of cord in case of starting delay. Instead of the spool, handle and cord a spring loaded starting device with a ratchet and release, may be provided and used in the manner known in the art.

In the upper face of the base of 20 and in the lower face of the cover 2 are two concentric grooves in line with the ends of the concentric rings 81 and 82. In these grooves are placed springs 33 and rings 34, the latter acting as seals against the ends of the rotor rings 81 and 82. If the rotors are to run at high speeds the grooves, springs 33 and rings 34 can be eliminated.

The flange 64 holding the blades 66 may be secured directly around the lower end of shaft 6 and run at turbine sped. However, if it is desired to operate the lawn mower at a slower speed, a speed reducing mechanism is built integrally with the casting 19. In a thickened portion of the casting 19A there is a hole in which is inserted a shaft 44. A cross hole allows a pin 48 to enter a cross hole in the shaft 44. A reduced end of pin 48 is screwed into a threaded cross hole, the pin 48 securing the shaft 44 against rotation. Around the shaft 44 is mounted a ball bearing 45 seated in a gear block 57 and 57A. In the larger gear block end 57 is a bushing 46 concentric to a spacer 111 which spaces the ball bearing 45 from the bottom face of 19A. The bushing 46 is secured to the gear 57 by bolts 46. The gear 57 meshes with a gear 56 which is keyed to and around the lower end of shaft 6 and held in place by nut 59 and washer 58.

Gear 57A meshes with a gear 50 which is keyed to and around a shaft 51. The upper end of this shaft 51 has a widened head which rests in a hole in an extended portion of the casting 19, designated 19B. Around the shaft 51 there is a roller bearing 53 which is held around the shaft 51 and inside 19B by a plate 53 and bolts 54 which enter 53 and 19B. Inside the gear 57A, around its portion of the shaft 44 is a bushing 49 which rests on the widened head of the bottom end of the shaft 44.

The following description of operation is referred to FIGS. 2 to 9 inclusive.

To start the operation of the system, the cord 38, wound around the spool 16, is pulled rapidly by the handle 39. This causes the shaft 6 to rotate. The shaft 6 being contiguous with the compressor-rotor 5 and the Tesla turbine 4 causes them to rotate. Air is sucked in through the filter screen 98, through the tube 100, into the chamber 10. Simultaneously, fuel is drawn through tube 104 into the hole 106 and through the tube 105 into the space 112 where it mixes with the inrushing air in chamber 10. As the rotor 5 rotates, the slider 87, moved radially out by the spring 89 and centrifugally slides along around the inner face of the wall of 20, causing the mixture to be compressed. As the slider passes the minimum radius of the rotor 5, rotating clockwise, just beyond the face of the valve 93, the valve is pushed back by the pressure of the fuel-air mixture, causing the latter to enter the combustion chamber 71 where the mixture is ignited by the glow plug 78. The combustion products enter the converging-diverging nozzle 32, impinge on the surfaces of the blades 25 spiralling toward the center to the holes 27 and exhausting through the passages 28.

The combustion gases by their properties of molecular adhesion (described by N. Tesla) to the surfaces of the disks cause the latter to rotate at high velocity, generating power at the end of the shaft 6. The converging-diverging nozzle changes the high pressure and temperature of the gases to a lower pressure and temperature and high velocity. Since the disks are flat and have no projecting surfaces or abutments such as are common to bladed turbines, these disks can rotate at high velocities and temperatures without substantial stress or creep.

The rate of fuel input or the ratio of fuel-air mixture is regulated by turning the knob 107.

The power produced at the end of shaft 6 is transmitted to the output shaft 57 which drives the mower blades 66, through the gear reduction system. Gear 56, driven by the shaft 6, drives the larger gear 57 which is integral with the smaller gear 57A which drives the larger gear 50 turning shaft 51 at a slower speed than that of shaft 6.

Figure 10:
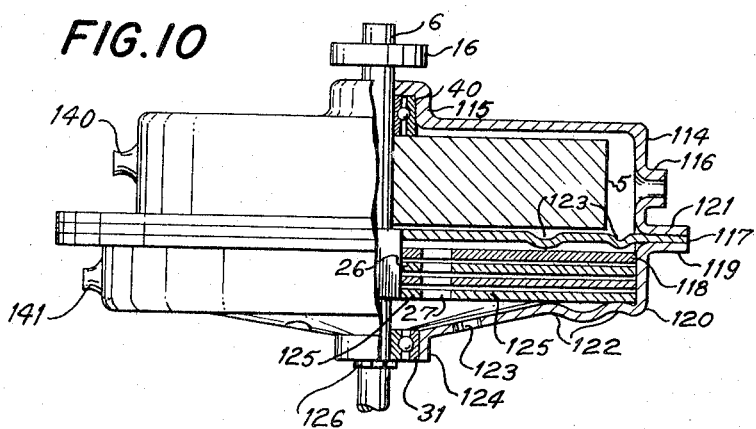
FIG. 10 is a front sectional view of another embodiment of my invention.

A modification of the engine structure is shown in FIG. 10 where the engine is shown with a quarter section exposed. The eccentrically postioned cup 114 houses the compressor-rotor 5 and is made of a one piece drawn shell with a circular flange 121. On one side of the cylindrical wall there is an outward boss 116 which has a hole in it for connecting the air and fuel input structure shown in FIG. 9. On another part of the same wall, shown in FIG. 10 out of location, is a second perforated boss 140 for enclosing the valve structure shown in FIG. 7. On the top center of the shell is drawn a cup 115 in which rests a ball bearing 40 which surrounds the shaft 6 which passes through a hole in the center of the cup. The shell 114 is the equivalent of cup 2 in FIG. 1. Directly under the shell and of the same diameter as the flange 121 is a stamped plate 117. Drawn or embossed in the lower surface thereof are two concentric ridges 118. If drawn, there are two corresponding grooves 123 on the top surface of the plate. These can be filled with a seal similar to those shown on 33 and 34 on FIG. 2.

Below the plate is a drawn shell 120 equivalent to 1 of FIG. 1, with a concentric flange 119 around the open end of the shell adjacent to the lower rim of the plate 117. The bottom of the shell is drawn out to contain ridges 122, a plurality of holes 123 around a central neck 124 which surrounds a ball bearing 31 around the shaft 6. The end of the shaft 6 projecting below the neck has a snap-ring 126 around it to retain the ball bearing. Around the shaft 6, inside the housing 120 are the disks 25 with the holes 27 and spacers 26 which comprise the Tesla turbine. The ridges 122 and 118 serve as seals against the disks during their rotation. Tangential to one part of the wall there is a perforated boss 141 which serves to connect to the combustion chamber and nozzle structures shown in FIGS. 3, 4 and 5. Above the bearing 31 there are two adjacent nuts on a threaded portion of the shaft 6 which serve to keep the stacked disks 25 and spacers 26 tightly together. The shaft 6 is suitably stepped and keyed. The flanges 121 and 119 and the rim of the plate 117 can be sealed together by clamps, by welding or by fasteners.

Figure 11:
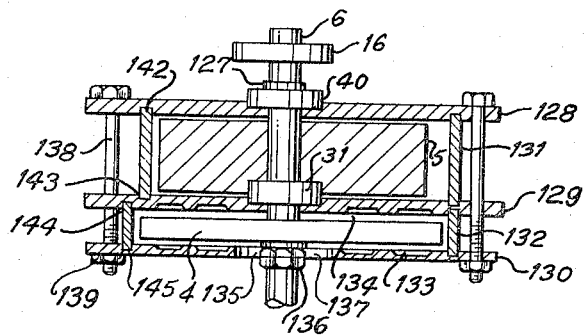
FIG. 11 is a front sectional view of another embodiment of my invention.

Another modification is shown in FIG. 11 where 128, 129 and 130 are plates (shown in one half section), circular or polygonal, of identical perimeters. The top plate has a hole in the center thereof to hold the shaft 6 and is recessed to retain the ball bearing 40 which is retained on its top by a snap-ring 127 around the shaft 6. The lower face of the plate has therein a groove 142 eccentric to the shaft 6. In the groove fits a cylindrical ring 131 which, together with the top plate 128 and the lower plate 129 forms a housing for the compressor-rotor 5, shown in half section around the shaft 6 which is suitably keyed to the rotor. The lower face of the rotor is recessed to retain the bearing 31 around the shaft 6. The plate 129 has on the lower surface thereof two grooves 134 concentric to the center hole which is recessed on the top surface to retain the bearing 31. Also machined on the lower face is a concentric groove 144. A cylindrical ring 132 is inserted in the groove 144. The plate 130 is provided with concentric grooves 133 and with the groove 145 to retain the lower end of the cylindrical ring 132. The center of the plate 130 is provided with a hole 135. The plate 130, the ring 132 and the plate 129 form a unitary structure to contain the Tesla turbine 4 (shown schematically). A pair of nuts 136 and 137 on a threaded portion of the shaft 6 serve to retain the turbine disks and spacers firmly together against a step on shaft 6 which is properly keyed to the disks and spacers. In the wall of the ring 131 are provided suitable holes (not shown here) to connect the air-fuel infeed mechanism and the output valve (shown in FIG. 6) and the wall of the ring 132 is suitably provided with a tangential hole (not shown here) adapted to receive the nozzle 32 (shown in FIG. 4).

Around the rim of plates 128, 129 and 130 are holes adapted to receive the bolts 138 which, with nuts 139, lock the assembly together. It is obvious that the structures shown in FIGS. 10 and 11 combine a novel simplicity of design of the component and their relationship, provide a reduced number of parts simple to manufacture in mass production and easy to maintain.

Figure 12:
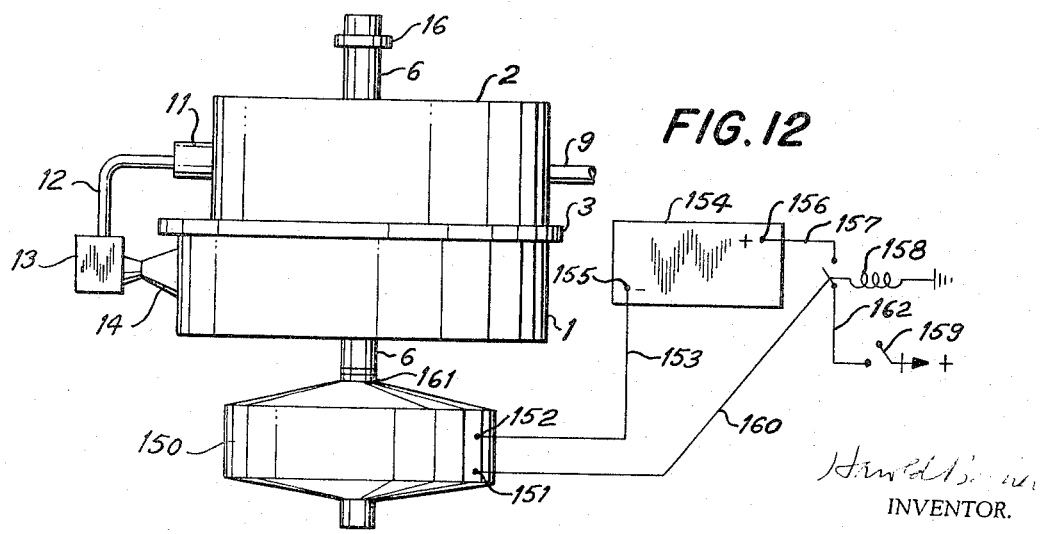
FIG. 12 is a view of my invention adapted as an auxiliary starter for automobile engines.

In FIG. 12 is shown, in schematic form, the application of this invention as a starting device for a stalled automobile engine, in case of failure of the automobile starter, either because of a cold engine or because the battery has run down. The shaft 6 of the motor unit FIG. 1 of my invention is joined to a 12 volt generator through coupling to the generator shaft 161. The generator is connected at lead 152 to the negative lead 155 of the battery 154 by the cable 153. The second generator lead 151 is connected to one pole of a relay switch by means of cable 160. The second pole of the relay switch is connected to the positive battery lead 156. The relay switch is connected to a dashboard switch 159 by cable 152. Orifice 9 is connected to the automobile carburetor. The combustion chamber contains a spark plug connected to the battery (not illustrated) and a glow plug or a flint sparker. The device is attached to the automobile in a suitable location, preferably under the engine hood.

To operate, the dashboard switch 159 is closed, causing the relay switch 158 to close the battery generator circuit. The residual battery current is generally sufficient to start rotation of the generator armature as a motor to begin rotation of the compressor and turbine and to have the spark plug detonate the compressed air-gasoline mixture. As the turbine accelerates the generator charges the battery quickly and furnishes sufficient power to crank the automobile starter. If, however, the battery is too weak, the car hood is raised and the device is started manually by operating the starting device 16 as hereinbefore described.

As mentioned before, the terms housing, shell, cup and casing are used herein interchangeably. In each case it is referenced for a cylindrical container, cup, shell or dome substantially closed at one end (except for functional holes for shafts or orifices) and open on the other end, whether resting on the cylindrical wall, closed end or open end.

It will be understood that modifications and variations may be effected without departing from the scope of the present invention, but it is understood that this application is to be limited only by the scope of the appended claims.

I claim:

1. A power generator, comprising, in combination, a plate, a shaft passing through said plate, a cup abutting its open end on said plate eccentrically to said shaft, a second cup abutting its open end on the opposite side of said plate concentrically to said shaft, a compressor-rotor in said eccentric cup concentric to said shaft, a Tesla disk turbine in said concentric cup concentric to said shaft, an intake port in said eccentric cup adapted to draw a mixture of air and fuel into said eccentric cup to be compressed by said compressor-rotor, an exhaust port in said eccentric cup adapted to discharge the compressed mixture, a combustion chamber communicating with said exhaust port, an intake opening in said concentric cup, a converging-diverging nozzle communicating at its inlet with said combustion chamber and communicating at its outlet tangentially with said opening, an opening on the roof of said concentric cup peripheral to said shaft adapted to exhaust the combustion products after they have passed through said Tesla disk turbine, and means on said shaft to initiate rotation thereof.

2. A power generator, comprising two cups abutting their respective open ends on the opposite surfaces of a partitioning plate, a shaft passing perpendicularly through said plate, one end of said shaft extending to the height of one cup concentrically thereto, the other portion of said shaft extending to the height of the second cup eccentrically thereto, a round compressor-rotor mounted concentrically on said shaft inside said eccentric cup, the circumference of said rotor contacting the inner circumference of the wall of said eccentric cup at one point, a port in said wall adapted to draw in a mixture of air and fuel, means in said rotor to effect compression of said mixture, an exhaust port in said wall adapted to discharge the said mixture, a combustion chamber communicating with said exhaust port adapted to ignite said mixture, a Tesla disk turbine mounted on the shaft in said concentric cup, means communicating from the said combustion chamber to said concentric cup adapted to discharge the combustion products from said combustion chamber tangentially into said concentric cup, said means being adapted to change the combustion gases from a high pressure-high temperature state into a lower temperature-high velocity state, and an opening in the roof of the concentric cup around said shaft to allow the escape of the combustion gases after they have passed through the Tesla turbine from the edge of said disks through the center of said disks during the operation of the power generator.

3. A power generator, comprising, in combination, a plate, a shaft passing through a hole in said plate and perpendicular to said plate, an annulus abutting on said plate concentric to said shaft, a second annulus abutting on the opposite surface of said plate eccentric to said shaft, a cover on each respective annulus substantially parallel to said plate whereby each annulus forms an enclosure on each surface of the plate, said shaft extending through each of said covers, a compressor-rotor on the shaft portion of said eccentric enclosure and concentric to said shaft, a Tesla disk turbine on the shaft portion of said concentric enclosure concentric thereto, an intake port in said eccentric enclosure adapted to draw in a fuel and air mixture, an exhaust port to discharge the mixture after compression by said compressor rotor, a combustion chamber connected to said exhaust port, means in said combustion chamber to ignite said mixture, a converging-diverging nozzle connected to said combustion chamber and said concentric enclosure adapted to feed the combustion products tangentially into said concentric enclosure, and an opening in the cover of said concentric enclosure around said shaft adapted to release the combustion products into the atmosphere after they have passed through the Tesla turbine.

4. A power generator, comprising, in combination, a circular cylindrical enclosure, a rotary compressor in said enclosure, a second circular cylindrical enclosure, a Tesla disk turbine in said second enclosure, a common base plate abutting each of its opposite surfaces on a respective end of each of said enclosures, a common shaft passing through the center of the said plate, the said rotary compressor and the said Tesla turbine, said enclosure of the rotary compressor being eccentric to said shaft, an inlet port in said rotary compressor enclosure adapted to draw in an air-fuel mixture, a discharge port in said rotary compressor enclosure to discharge said mixture after a compression, a converging-diverging nozzle leading tangentially into said second enclosure, a combustion chamber communicating between said discharge port and said nozzle, means in said combustion chamber for igniting said mixture, and means in said second enclosure for discharging the combustion products to the atmosphere after they have gone through the Tesla turbine.

5. The power generator claimed in claim 1, and a pair of lawn mower blades mounted at one end of said shaft and means for mounting said combination to the frame of a lawn mower.

6. The power generator claimed in claim 1, and speed changer attached at one end of said shaft and a power output shaft in said speed changer.

7. The power generator claimed in claim 1 and a speed changer attached at one end of said shaft and an output shaft in said speed changer, and a pair of lawn mower blades attached to said shaft.

No references cited.

MARK NEWMAN, *Primary Examiner.*

R. D. BLAKESLEE, *Assistant Examiner.*